(12) United States Patent
Morikawa et al.

(10) Patent No.: US 12,345,295 B2
(45) Date of Patent: Jul. 1, 2025

(54) SLIDING MEMBER AND METHOD FOR PRODUCING SLIDING MEMBER

(71) Applicant: DAIDO METAL COMPANY LTD., Aichi (JP)

(72) Inventors: Takashi Morikawa, Aichi (JP); Masahiro Nakai, Aichi (JP)

(73) Assignee: DAIDO METAL COMPANY LTD., Aichi (JP)

( * ) Notice: Subject to any disclaimer, the term of this patent is extended or adjusted under 35 U.S.C. 154(b) by 0 days.

(21) Appl. No.: 18/122,550

(22) Filed: Mar. 16, 2023

(65) Prior Publication Data

US 2023/0313835 A1 Oct. 5, 2023

(30) Foreign Application Priority Data

Mar. 30, 2022 (JP) ................................. 2022-056212

(51) Int. Cl.
| | |
|---|---|
| *F16C 33/12* | (2006.01) |
| *B22D 13/02* | (2006.01) |
| *B22D 19/08* | (2006.01) |
| *C22C 9/00* | (2006.01) |
| *F16C 33/14* | (2006.01) |

(52) U.S. Cl.
CPC ............ *F16C 33/121* (2013.01); *B22D 13/02* (2013.01); *B22D 19/08* (2013.01); *C22C 9/00* (2013.01); *F16C 33/14* (2013.01); *F16C 2204/18* (2013.01)

(58) Field of Classification Search
None
See application file for complete search history.

(56) References Cited

U.S. PATENT DOCUMENTS

| 10,288,118 B2 | 5/2019 | Toda | |
|---|---|---|---|
| 2017/0037899 A1* | 2/2017 | Wada | ........................ B32B 15/01 |
| 2018/0258991 A1* | 9/2018 | Toda | ...................... C23C 28/021 |
| 2019/0218646 A1* | 7/2019 | Toda | ......................... F16C 33/12 |
| 2020/0132117 A1* | 4/2020 | Toda | ..................... B22D 13/023 |

FOREIGN PATENT DOCUMENTS

| EP | 2980430 A1 | 2/2016 |
|---|---|---|
| JP | 2018053349 A | 4/2018 |
| JP | 2018145505 A | 9/2018 |

OTHER PUBLICATIONS

Extended European Search Report dated Aug. 29, 2023, for European Patent Application No. 23159291.6.

* cited by examiner

*Primary Examiner* — Xiaobei Wang
(74) *Attorney, Agent, or Firm* — KARCESKI IP LAW, PLLC (57) ABSTRACT

A sliding member includes a base material and an alloy layer that includes Cu as a main component and Bi and having a sliding surface formed on a side opposite to the base material. The alloy layer has a first region and a second region. The first region is set to a region taking up 30% of the thickness of the alloy layer which is from an interface in contact with the base material toward the sliding surface. The second region is set to a region taking up 10% of the thickness of the alloy layer which is from the sliding surface toward the base material. A larger number of Bi phases having larger cross-sectional areas are distributed in an arbitrary observation cross section as Bi phases included in the second region compared to Bi phases included in the first region.

4 Claims, 9 Drawing Sheets

| | Components | | First cooling stage | | Second cooling stage | | Heat treatment | | Bi phase of 250μm² or more | | Seizure resistance (MPa) | Fatigue resistance (MPa) |
|---|---|---|---|---|---|---|---|---|---|---|---|---|
| | Bi content (mass%) | Sn content (mass%) | Water rate (L/min) | Time (s) | Water rate (L/min) | Time (s) | Temp. (°C) | Time (h) | Second region (%) | First region (%) | | |
| Example 1 | 5 | 10 | 25 | 15 | 5 | 60 | 750 | 1.5 | 10.7 | 1.8 | 25 | 70 |
| Example 2 | 10 | 10 | 25 | 15 | 5 | 60 | 750 | 1.5 | 14.1 | 2.7 | 26 | 70 |
| Example 3 | 25 | 10 | 25 | 15 | 5 | 60 | 750 | 1.5 | 26.9 | 5.3 | 29 | 60 |
| Example 4 | 10 | 10 | 70 | 5 | 5 | 60 | 750 | 1.5 | 14.3 | 2.8 | 26 | 70 |
| Example 5 | 10 | 10 | 7.5 | 40 | 5 | 60 | 750 | 1.5 | 13.9 | 2.7 | 26 | 70 |
| Example 6 | 10 | 10 | 50 | 15 | 0 | 0 | 750 | 1.5 | 14.1 | 2.7 | 26 | 70 |
| Example 7 | 10 | 10 | 25 | 15 | 5 | 60 | 650 | 1.0 | 14.0 | 2.9 | 25 | 70 |
| Example 8 | 10 | 10 | 25 | 15 | 5 | 60 | 800 | 1.5 | 13.9 | 2.8 | 26 | 60 |
| Comparative Example 1 | 10 | 10 | 100 | 50 | 5 | 60 | 750 | 1.5 | 2.7 | 2.6 | 19 | 70 |
| Comparative Example 2 | 10 | 10 | 25 | 15 | 30 | 120 | 750 | 1.5 | 2.8 | 2.7 | 19 | 70 |
| Comparative Example 3 | 10 | 10 | 5 | 1 | 5 | 60 | 750 | 1.5 | 14.4 | 14.2 | 26 | 40 |
| Comparative Example 4 | 10 | 10 | 25 | 15 | 5 | 60 | n/a | n/a | 4.6 | 0.9 | 20 | 75 |
| Comparative Example 5 | 10 | 10 | 25 | 15 | 5 | 60 | 600 | 1.5 | 4.7 | 1.0 | 20 | 75 |
| Comparative Example 6 | 10 | 10 | 25 | 15 | 5 | 60 | 750 | 0.5 | 9.8 | 1.5 | 22 | 75 |
| Comparative Example 7 | 10 | 10 | 5 | 1 | 5 | 60 | 750 | 0.3 | 6.5 | 6.3 | 20 | 55 |

Fig.8

| | Components | | First cooling stage | | Second cooling stage | | | Heat treatment | | Bi phase of 250μm² or more | | Seizure resistance (MPa) | Fatigue resistance (MPa) |
|---|---|---|---|---|---|---|---|---|---|---|---|---|---|
| | Bi content (mass%) | Other components (mass%) | Water rate (L/min) | Time (s) | Water rate (L/min) | Time (s) | | Temp. (°C) | Time (h) | Second region(%) | First region(%) | | |
| Example 2 | 5 | | 25 | 15 | 5 | 60 | | 750 | 1.5 | 10.7 | 1.8 | 25 | 70 |
| Example 9 | 10 | Sn:0 | 25 | 15 | 5 | 60 | | 750 | 1.5 | 14.1 | 2.7 | 26 | 65 |
| Example 10 | 10 | Sn:5 | 25 | 15 | 5 | 60 | | 750 | 1.5 | 14.1 | 2.7 | 26 | 70 |
| Example 11 | 10 | Sn:15 | 25 | 15 | 5 | 60 | | 750 | 1.5 | 14.1 | 2.7 | 26 | 70 |
| Example 12 | 10 | Sn:10,Al:2,Fe:3 | 25 | 15 | 5 | 60 | | 750 | 1.5 | 14.3 | 2.8 | 26 | 75 |
| Example 13 | 10 | Sn:10,Zn:3 | 25 | 15 | 5 | 60 | | 750 | 1.5 | 13.9 | 2.7 | 26 | 75 |
| Example 14 | 10 | Sn:10,Mn:2,Si:0.5 | 25 | 15 | 5 | 60 | | 750 | 1.5 | 14.1 | 2.7 | 26 | 75 |
| Example 15 | 10 | Sn:10,Ni:2 | 25 | 15 | 5 | 60 | | 750 | 1.5 | 14.0 | 2.9 | 26 | 75 |
| Example 16 | 10 | Sn:10,Fe:1,P:0.1 | 25 | 15 | 5 | 60 | | 750 | 1.5 | 13.9 | 2.8 | 26 | 75 |
| Example 17 | 10 | Sn:10,Zr:0.1,Ti:0.1,Mg:0.1 | 25 | 15 | 5 | 60 | | 750 | 1.5 | 14.5 | 2.6 | 26 | 75 |
| Example 18 | 10 | Sn:10,Mo₂C:1.5(vol.%) | 25 | 15 | 5 | 60 | | 750 | 1.5 | 14.4 | 2.7 | 30 | 70 |
| Example 19 | 10 | Sn:10,Mn:2,Si:0.5,Gr:1.5(vol.%) | 25 | 15 | 5 | 60 | | 750 | 1.5 | 13.8 | 2.4 | 30 | 75 |

Fig.9

| | Component | First cooling stage | | Second cooling stage | | Bi phase of 250μm² or more | | Seizure resistance (MPa) | Fatigue resistance (MPa) |
|---|---|---|---|---|---|---|---|---|---|
| | Bi content (mass %) | Water rate (L/min) | Time (s) | Water rate (L/min) | Time (s) | Second region (%) | First region (%) | | |
| Example 2 | 10 | 25 | 15 | 5 | 60 | 14.1 | 2.7 | 26 | 70 |
| Comparative Example 8 | 10 | 80 | 40 | 5 | 60 | 7.3 | 2.5 | 21 | 70 |
| Comparative Example 9 | 10 | 5 | 5 | 5 | 60 | 14.3 | 6.9 | 26 | 50 |

SLIDING MEMBER AND METHOD FOR PRODUCING SLIDING MEMBER

CROSS-REFERENCE TO RELATED APPLICATION(S)

This application relies on and claims priority to Japanese Patent Application No. 2022-056212, filed on Mar. 30, 2022, the entire contents of which are incorporated herein by reference.

FIELD OF THE INVENTION

The present embodiment relates to a sliding member and a method for producing a sliding member.

DESCRIPTION OF THE RELATED ART

In a sliding member having a Cu-based alloy layer, it is known to add Bi to the alloy layer. Bi added to the alloy layer forms a soft phase that is softer than the matrix in the alloy layer. Thereby, the sliding member having a Cu-based alloy layer is improved in conformability and seizure resistance.

In recent years, the load applied to a sliding member has been increasing because of the increase in engine output, the decrease in bearing area associated with the downsizing of an engine, and the like. Because of this, a sliding member is required to have higher seizure resistance. In order to improve the seizure resistance of a sliding member, it is preferable to increase the amount of Bi added to the alloy layer (Japanese Patent Laid-Open No. 2018-53349 and Japanese Patent Laid-Open No. 2018-145505).

However, a problem is that when Bi included in the alloy layer is increased, the fatigue resistance decreases. Because of this, it is difficult to further improve the seizure resistance of the sliding member simply by increasing the amount of Bi added to the alloy layer.

Therefore, an object is to provide a sliding member that is further improved in seizure resistance without causing a decrease in fatigue resistance by controlling Bi added to the alloy layer, and a method for producing a sliding member.

SUMMARY OF THE INVENTION

A sliding member according to one embodiment includes a base material and an alloy layer including Cu as a main component and Bi and having a sliding surface formed on a side opposite to the base material. The alloy layer has a first region and a second region. The first region is set to a region taking up 30% of the thickness of the alloy layer which is from the interface in contact with the base material toward the sliding surface. The second region is set to a region taking up 10% of the thickness of the alloy layer which is from the sliding surface toward the base material. A larger number of Bi phases having larger cross-sectional areas are distributed in an arbitrary observation cross section as Bi phases included in the second region compared to Bi phases included in the first region.

As described above, as the Bi phases included in the second region near the sliding surface, a larger number of Bi phases having large cross-sectional areas are distributed compared to the Bi phases included in the first region near the base material. When the temperature of the alloy layer is increased by sliding between the sliding member and a mating material, the Bi phases included in the alloy layer are eluted from the matrix of the alloy layer. In particular, the Bi phases distributed in the second region near the sliding surface are eluted from the matrix of the alloy layer and spread in the form of a layer between the sliding member and the mating material. This Bi is a soft metal, and thus Bi in the form of a layer present between the alloy layer and the mating material relaxes the local contact between the alloy layer and the mating material. As a result, the seizure between the sliding phase and the mating material during the sliding is reduced. On the other hand, in the first region of the alloy layer, the Bi phases are mainly refined. The finer the Bi phases distributed in the matrix of the alloy layer are, the more impeded the propagation of a crack inside the alloy layer is. Because of this, in the alloy layer, the propagation of a crack is suppressed in the first region near the base material. Thereby, the peeling between the alloy layer and the base material due to the propagation of a crack is reduced to improve the fatigue resistance. Therefore, by controlling Bi added to the alloy layer, the seizure resistance can be further improved without causing the decrease of the fatigue resistance.

In the sliding member according to one embodiment, preferably, the Bi phases dispersed in the first region having a cross-sectional area of 250 μm$^2$ or more have a proportion by number of 6% or less in an arbitrary observation cross section, and the Bi phases dispersed in the second region having a cross-sectional area of 250 μm$^2$ or more have a proportion by number of 10% or more in an arbitrary observation cross-section.

In addition, a method for producing a sliding member according to one embodiment includes a casting step and a cooling step. In the casting step, an alloy layer including Cu as a main component and Bi is cast on one surface of the base material. In the cooling step, the base material from the casting step is cooled at the other surface of the base material with a coolant to solidify the alloy layer in one direction. In the cooling step, when a preset set time has elapsed from the start thereof, the supply rate of the coolant is reduced to thereby control the size and number of the Bi phases included in the alloy layer in the thickness direction of the alloy layer.

Thereby, in the method for producing a sliding member according to one embodiment, the size and number of the Bi phases are controlled in the first region near the base material and the second region near the sliding surface in the alloy layer. Therefore, Bi added to the alloy layer can be controlled, and the seizure resistance can be further improved without causing the decrease of the fatigue resistance.

The method for producing a sliding member according to one embodiment preferably further includes, after the cooling step, a heat treatment step of holding a sliding member having the alloy layer formed on the base material at 650 to 800° C. for 1 hour or more.

In addition, in the method for producing a sliding member according to one embodiment, the casting step is preferably centrifugal casting involving forming the alloy layer on the inner peripheral surface of the base material in a cylindrical shape while rotating the base material around an axis.

DETAILED DESCRIPTION OF EMBODIMENT(S) OF THE INVENTION

Hereinafter, a sliding member according to one embodiment will be described based on the drawings.

Figure 1:
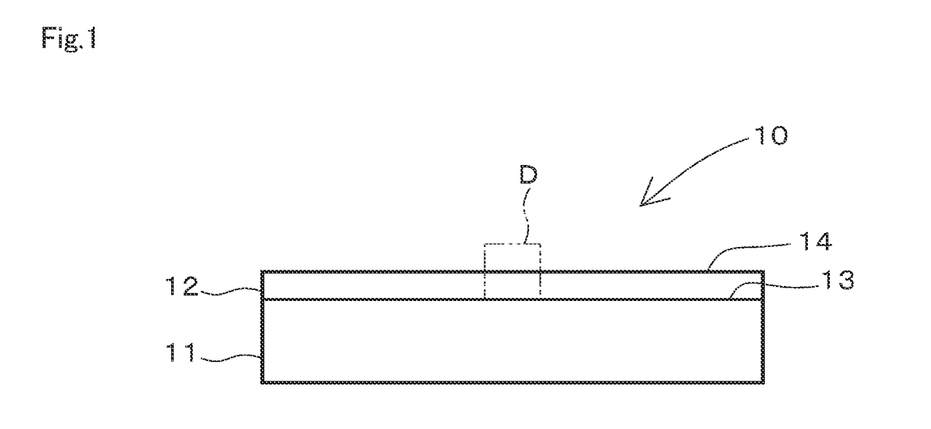
FIG. 1 shows a schematic view showing the structure of a sliding member according to one embodiment.

As shown in FIG. 1, a sliding member 10 includes a base material 11 and an alloy layer 12. The alloy layer 12 is provided on the base material 11 by being cast on an interface 13 on one surface of the base material 11. A surface of the alloy layer 12 of the sliding member 10 serves as a sliding surface 14. In this case, the alloy layer 12 is preferably cast directly on the interface 13 on the base material 11.

The base material 11 is a so-called back metal layer, and is formed of an Fe-base or Cu-base material. In the case of an Fe-base base material 11, for example, hypoeutectoid steel, eutectoid steel, hypereutectoid steel, cast iron, high-speed steel, tool steel, austenitic stainless steel, or ferritic stainless steel can be used. In addition, in the case of a Cu-base base material 11, for example, pure copper, phosphor bronze, brass, chromium copper, beryllium copper, or Corson alloy can be used. The base material 11 preferably has a thickness of about 1.0 to 25.0 mm.

The alloy layer 12 includes Cu as a main component and Bi. In addition, the alloy layer 12 may include about 5 to 15% by mass of Sn. The alloy layer 12 can improve the fatigue resistance by including Sn. When the proportion of Sn included in the alloy layer 12 is 5% by mass or less, the contribution to improvement of the fatigue resistance becomes small. On the other hand, when the proportion of Sn included in the alloy layer 12 exceeds 15% by mass, a Cu—Sn compound composed of Cu, which is the main component of the alloy layer 12, and Sn is likely to precipitate. Because of this, when Sn is excessive, a decrease in adhesive strength between the base material 11 and the alloy layer 12 is caused.

The alloy layer 12 may include one or two or more of Al, Zn, Mn, Si, Ni, Fe, P, Zr, Ti, and Mg as an additive element. The content of such an additive element in the alloy layer 12 is preferably 5% by mass or less. Al, Zn, Mn, Si, Ni, P, Zr, Ti, and Mg contribute to solid solution strengthening. Mn, Si, Ni, Fe, P, Zr, Ti, and Mg contribute to compound precipitation. In addition, the alloy layer 12 may include one or both of $Mo_2C$ and graphite in addition to the above additive elements. The total proportion of $Mo_2C$ or graphite included in the alloy layer 12 is preferably 10% by volume or less.

Figure 2:
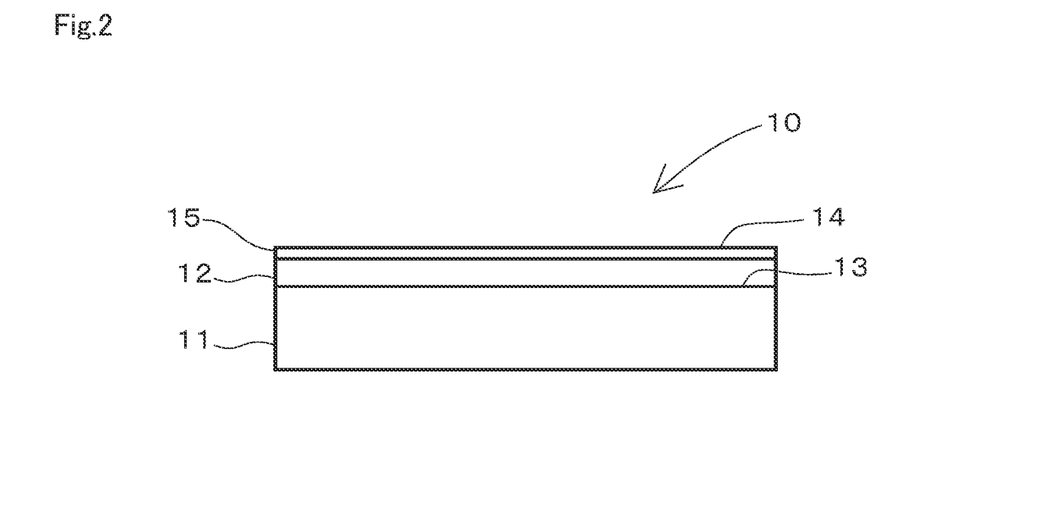
FIG. 2 shows a schematic view showing the structure of a sliding member according to one embodiment.

In addition to the base material 11 and the alloy layer 12, the sliding member 10 may include an overlay layer 15 as shown in FIG. 2. The overlay layer 15 is formed in a layer form on the surface of the alloy layer 12, that is, the surface on a side opposite to the base material 11. The overlay layer 15 preferably uses a soft metal such as Sn or Bi. In addition, the overlay layer 15 may use, for example, a resin in which a solid lubricant is dispersed. When the sliding member 10 includes the overlay layer 15, the outermost surface of the overlay layer 15 serves as the sliding surface 14 that slides against a mating material.

Figure 3:
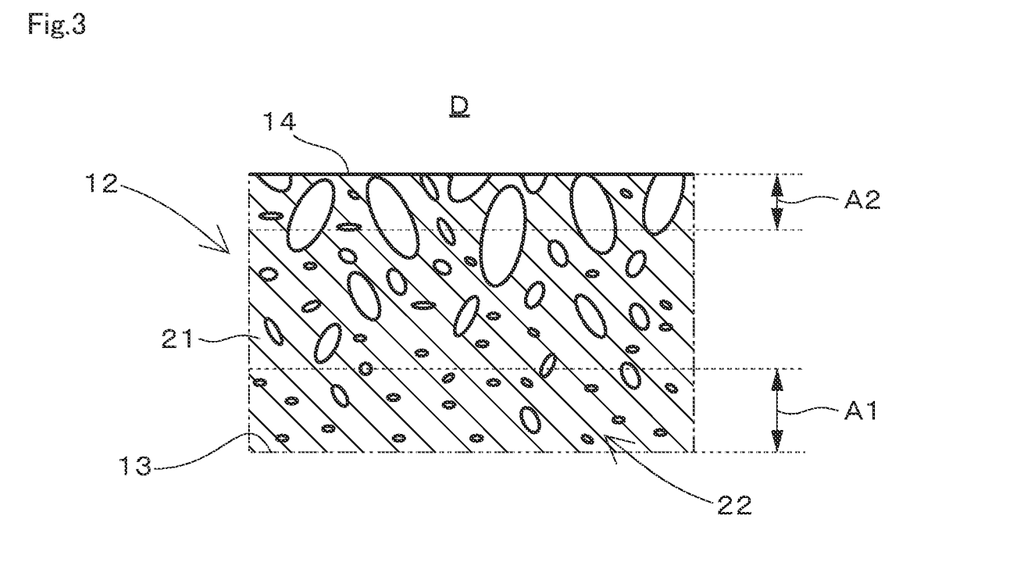
FIG. 3 shows a schematic cross-sectional view showing the structure of the texture of the alloy layer in an observation cross-section of a sliding member according to one embodiment.

The alloy layer 12 has a first region A1 and a second region A2 in the thickness direction as shown in FIG. 3. In the case of the embodiment shown in FIG. 3, the first region A1 is set to a region taking up 30% of the thickness of the alloy layer 12 which is from the interface 13 between the alloy layer 12 and the base material 11 toward the sliding surface 14 in the thickness direction of the alloy layer 12. The second area A2 is set to a region taking up 10% of the thickness of the alloy layer 12 which is from the sliding surface 14 toward the base material 11 in the thickness direction of the alloy layer 12. The alloy layer 12 has Bi phases 22 dispersed in a matrix 21. The Bi phases 22 are different in cross-sectional area in an arbitrary observation cross-section D between the first region A1 and the second region A2. Specifically, many of the Bi phases included in the second region A2 are larger than the Bi phases included in the first region A1. The observation cross section D is an arbitrary region set to an arbitrary cross section obtained by cutting the alloy layer 12 in the thickness direction as shown in FIG. 1. When an intermediate layer is provided between the base material 11 and the alloy layer 12, the first region A1 is set to a region taking up 30% of the thickness of the alloy layer 12 which is from the interface of the alloy layer 12 facing toward the base material 11, that is, the interface between the alloy layer 12 and the intermediate layer, toward the sliding surface 14.

The alloy layer 12 includes Bi phases 22 having various cross-sectional areas in an arbitrary observation cross section D as shown in FIG. 3. Here, a Bi phase 22 having a cross-sectional area of 250 $\mu m^2$ or more in an arbitrary observation cross section D is referred to as a "specific Bi phase." In the case of the present embodiment, the proportion by number in the observation cross section D of the "specific Bi phases" dispersed in the first region A1 near the base material 11 is 6% or less. On the other hand, the proportion by number in the observation cross section D of the "specific Bi phases" dispersed in the second region A2 near the sliding surface 14 is 10% or more. As described above, a larger number of "specific Bi phases" having a large cross-sectional area are included in the second region A2 near the sliding surface 14 than in the first region A1 near the base material 11. In other words, in the present embodiment, for the Bi phases 22 included in the alloy layer 12, a large number of Bi phases 22 having small cross-sectional areas are distributed on the side near the base material 11, and a large number of Bi phases 22 having large cross-sectional areas are distributed on the side near the sliding surface 14. The upper limit of the cross-sectional area of the Bi phases 22 included in the alloy layer 12 is preferably about 10,000 $\mu m^2$. That is, the cross-sectional area of the "specific Bi phases" is preferably 250 to 10,000 $\mu m^2$. In addition, the average area of the Bi phases 22 included in the first region A1 is preferably in the range of 10 to 80 $\mu m^2$. On the other hand, the average area of the Bi phases 22 included in the second region A2 is preferably in the range of 120 to 450 µm². Moreover, the average area of the Bi phases 22 in the second region A2 is preferably two or more times the average area of the Bi phases 22 in the first region A1. As described above, the Bi phases 22 included in the first region A1 near the sliding surface 14 has a larger average area than the Bi phases 22 included in the second region A2 near the interface 13 between the alloy layer 12 and the base material 11.

Figure 4:
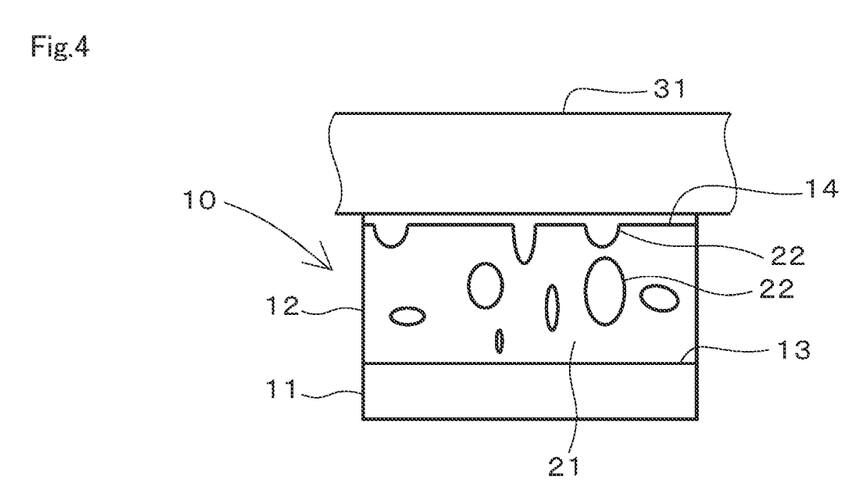
FIG. 4 shows a schematic view showing the state of a sliding member according to one embodiment when it slides against a mating material.

The alloy layer 12 has a structure in which the Bi phases 22 are dispersed in the matrix 21, which is a texture of a Cu-based alloy. The Bi phases 22 included in the alloy layer 12 contribute to reduction of the seizure when the sliding member 10 slides against a mating material 31 as shown in FIG. 4. Specifically, when the sliding member 10 and the mating material 31 slide against each other, the temperature of the alloy layer 12 in contact with the mating material 31, particularly the sliding surface 14, rises. When the temperature of the alloy layer 12 rises because of the sliding, the Bi phases 22 included in the alloy layer 12 are eluted from the matrix 21 of the alloy layer 12. In particular, the Bi phases 22 facing on the sliding surface 14 is eluted from the matrix 21 of the alloy layer 12. The eluted Bi spreads in the form of a layer on the sliding surface 14 where the sliding member 10 and the mating material 31 slide against each other. This Bi is a soft metal, and thus the Bi present between the alloy layer 12 and the mating material 31 relaxes the local contact therebetween. As a result, the seizure of the sliding member 10 during the sliding thereof against the mating material 31 is reduced by the eluted Bi.

As described above, the Bi phases 22 included in the alloy layer 12 contribute to the reduction of the seizure. At this time, among the Bi phases 22 dispersed in the alloy layer 12, those present at a position near the sliding surface 14 mainly serve as the Bi that contributes to the reduction of the seizure. Because of this, by enlarging the Bi phases 22 dispersed in a region near the sliding surface 14, the seizure resistance of the sliding member 10 can be improved. In the present embodiment, the alloy layer 12 includes a large number of "specific Bi phases" having a cross-sectional area of 250 µm² or more in the second region A2 near the sliding surface 14. Because of this, sufficient Bi is supplied to the sliding surface 14 where the sliding member 10 and the mating material 31 come into contact with each other, from large "specific Bi phases" included in the matrix 21 as a source thereof. In particular, by setting 10% in the thickness direction from the sliding surface 14 as the second region A2, the "specific Bi phases" included in the second region A2 are reliably and quickly supplied to the sliding surface 14.

Figure 5:
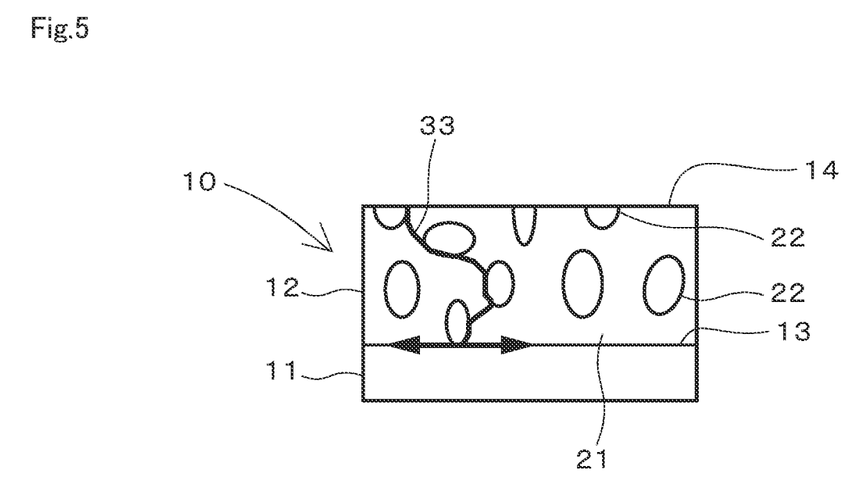
FIG. 5 shows a schematic view showing a crack propagating through the alloy layer in a sliding member of a Comparative Example.

On the other hand, the Bi phases 22 formed of Bi, which is a soft metal, are softer and lower in strength than the matrix 21 of a Cu-based alloy. Because of this, when a crack 33 occurs in the vicinity of the sliding surface 14, the crack 33 is likely to propagate along the boundaries between the matrix 21 and the Bi phases 22 as shown in FIG. 5. At this time, when the crack 33 occurring in the vicinity of the sliding surface 14 propagates through the alloy layer 12 and reaches the interface 13 between the base material 11 and the alloy layer 12, the alloy layer 12 peels from the base material 11, and this may lead to fatigue fracture. Such peeling of the alloy layer 12 causes a decrease in the fatigue resistance of the sliding member 10.

The larger the Bi phases 22, the longer the boundaries between the matrix 21 and the Bi phases 22, and the easier it is for these boundaries to be continuous. Because of this, the cracks 33 occurring in the matrix 21 is likely to propagate toward the base material 11 deeper through the boundaries between the matrix 21 and the Bi phases 22. As a result, the crack 33 occurring in the vicinity of the sliding surface 14 is likely to propagate toward the base material 11. For these reasons, it is important to refine the Bi phases 22 to suppress the propagation of the crack 33, in order to improve the fatigue resistance. Therefore, in the present embodiment, as shown in FIG. 3, the alloy layer 12 includes a small number of "specific Bi phases" having a cross-sectional area of 250 µm² or more in the first region A1 near the interface 13 between the alloy layer 12 and the base material 11. In particular, 30% of the alloy layer 12 in the thickness direction from the interface 13 between the alloy layer 12 and the base material 11 toward the sliding surface 14 is set as the first region A1, and the number of the "specific Bi phases" included in this first region A1 is small. Thereby, the Bi phases 22 included in the first region A1 are mainly refined. Because of this, in the inside of the alloy layer 12, particularly in the first region A1 near the base material 11, the propagation of the crack 33 is suppressed. As a result, peeling of the alloy layer 12 is reduced to improve the fatigue resistance of the sliding member 10.

As described above, in the present embodiment, the Bi phases 22 included in the alloy layer 12 differ in size and number in the thickness direction of the alloy layer 12. That is, in the case of the present embodiment, the alloy layer 12 includes a larger number of "specific Bi phases" having a large cross-sectional area in the second region A2 than in the first region A1. Because of this, sufficient Bi is supplied to the sliding surface 14 from these "specific Bi phases" to reduce the seizure during the sliding against the mating material 31. On the other hand, the alloy layer 12 includes a small number of "specific Bi phases" having a large cross-sectional area in the first region A1 than in the second region A2, to refine the Bi phases 22 in the first region A1. Because of this, the propagation of the crack 33 occurring in the vicinity of the sliding surface 14 of the alloy layer 12 is suppressed in the first region A1. As a result, peeling of the alloy layer 12 from the base material 11 is reduced to improve the fatigue resistance of the sliding member 10. Therefore, by controlling the size and number of the Bi phases included in the alloy layer 12, the seizure resistance can be further improved without causing the decrease of the fatigue resistance.

In the present embodiment, the content of Bi included in the alloy layer 12 is preferably 5 to 25% by mass. Bi contributes to improvement of the seizure resistance when the content thereof in the alloy layer 12 is 5% by mass or more. On the other hand, Bi is flexible, and thus an excessive content thereof in the alloy layer 12 affects the fatigue resistance. Therefore, the content of Bi included in the alloy layer 12 is preferably 25% by mass or less. In addition, the thickness of the alloy layer 12 is preferably set to about 0.1 to 5.0 mm.

Further, the "specific Bi phases" included in the first region A1 of the alloy layer 12 preferably have a proportion by number of 1 to 6% in an observation cross section D. When the proportion by number of the "specific Bi phases" in the first region A1 is less than 1%, the content of Bi in the entire alloy layer 12 is likely to be less than 5% by mass, which does not contribute to improvement of the seizure resistance of the alloy layer 12. On the other hand, when the proportion by number of the "specific Bi phases" in the first region A1 is greater than 6%, the content of Bi in the alloy layer 12 is likely to be greater than 30% by mass, which increases the amount of Bi, which is expensive, used. In addition, the "specific Bi phases" included in the second region A2 of the alloy layer 12 preferably have a proportion by number of 10 to 30% in an observation cross section D. When the proportion by number of the "specific Bi phases" in the second region A2 is less than 10%, Bi supplied to the sliding surface 14 becomes insufficient, which does not contribute to improvement of the seizure resistance of the alloy layer 12. On the other hand, when the proportion by number of the "specific Bi phases" in the second region A2 is greater than 30%, the content of Bi in the entire alloy layer 12 is greater than 30% by mass, which increases the amount of Bi, which is expensive, used.

Next, a method for producing the sliding member 10 having the above configuration will be described.

Figure 6:
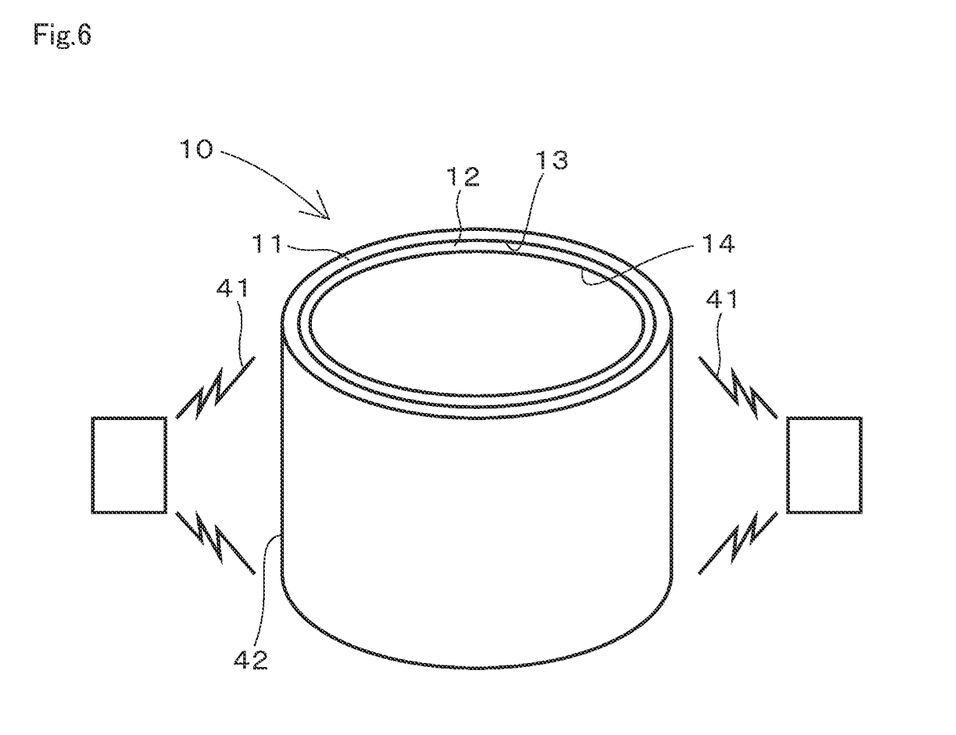
FIG. 6 shows a schematic view showing a method for producing a sliding member according to one embodiment.

First, the base material 11 is provided. In the case of the present embodiment, the base material 11 is formed into a cylindrical shape as shown in FIG. 6. The base material 11 provided is subjected to a casting step of casting an alloy to be the alloy layer 12. A Cu-based alloy including Bi to be the alloy layer 12 is supplied in a molten state and cast in such a way as to be overlaid on the base material 11. When the base material 11 in a cylindrical shape is used as in the present embodiment, the alloy to be the alloy layer 12 is cast on the inner peripheral surface of the base material 11 in a cylindrical shape by centrifugal casting. Before casting the alloy to be the alloy layer 12, the oxide film formed on the surface of the base material 11 is preferably removed by using, for example, an oxide film removing agent. In this case, the oxide film is removed from the base material 11 by, for example, immersing the base material 11 in an oxide film removing agent. The removing agent rises to the outermost surface of the alloy layer 12 together with the removed oxide film when the alloy layer 1 is formed, and solidifies together with the oxide film. By removing the solidified product, the oxide film on the surface of the base material 11 is easily removed after the alloy layer 12 is formed.

Simultaneously with this casting step, the base material 11 is subjected to a cooling step of cooling the base material 11 with a coolant 41. Specifically, the base material 11 is cooled by the coolant 41 from the side opposite to the interface 13 where the alloy layer 12 is formed. When the base material 11 in a cylindrical shape as in the present embodiment is used, the cooling is carried out by providing the coolant 41 to an outer peripheral surface 42 of the base material 11 in a cylindrical shape. The coolant 41 is, for example, a liquid such as water or an oil, or a gas such as air. The coolant 41 may be a solid such as dry ice. The base material 11 is cooled at the outer peripheral surface 42 on a side opposite to the alloy layer 12 formed, by, for example, spraying or bombarding such a coolant 41. Thereby, the alloy layer 12 formed on the base material 11 is solidified in one direction from the outer peripheral surface 42 of the base material 11.

In this cooling step, the supply rate of the coolant 41 is reduced when a preset set time has elapsed from the start thereof. Specifically, the cooling step includes a first cooling stage and a second cooling stage. In the first cooling stage, the supply rate of the coolant 41 is large, and the alloy layer 12 formed is rapidly cooled. In the second cooling stage, the supply rate of the coolant 41 is small, and the alloy layer 12 formed is gradually cooled. The cooling step is carried out simultaneously with and in parallel with the casting step that is continuous, and shifts from the first cooling stage to the second cooling stage continuously because of the difference in the supply rate of the coolant 41. That is, in the cooling step, the first cooling stage is started along with the casting step, and after a preset predetermined period of time has elapsed, the supply rate of the coolant 41 is reduced, and thereby the cooling step shifts to the second cooling stage. As an example, the first cooling step is carried out for 5 to 40 seconds, for example, with the rate of water provided per cm³ of the base material 11 set to 0.05 to 0.5 liters/min. Then, the second cooling stage, which is carried out after the first cooling stage is completed, is carried out for 10 seconds or more, for example, with the rate of water provided per cm³ of the base material 11 set to 0.05 liters/min or less. Specific numerical values in these first cooling stage and second cooling stage are only examples, and can be arbitrarily changed according to the dimensions of the base material 11 used, the type of the alloy layer 12, or the like.

By rapidly cooling the alloy cast in the first cooling stage, the cast alloy is rapidly solidified in the first region A1 of the alloy layer 12 near the base material 11. Because of this, the growth of the Bi phases 22 included in the first region A1 of the alloy layer 12 is inhibited to refine the Bi phases 22 included in the alloy layer 12. On the other hand, by changing the supply rate of the coolant 41 in the middle of casting the alloy to shift to the second cooling stage, the cast alloy is solidified relatively slowly in the second region A2 of the alloy layer 12 far from the base material 11. Because of this, the growth of the Bi phases 22 included in the second region A2 of the alloy layer 12 is promoted to enlarge the Bi phases 22 included in the alloy layer 12.

As described above, in the production method according to the present embodiment, by changing the cooling of the alloy layer 12 formed in the cooling step, the first region A1 including fine Bi phases 22 is formed on the side near the base material 11, and the second region A2 including large Bi phases 22 is formed on the side near the sliding surface 14.

Further, the present embodiment includes a heat treatment step after the cooling step. The heat treatment step is carried out after the alloy layer 12 is formed by casting the base material 11. The sliding member 10 having the alloy layer 12 formed on the base material 11 is subjected to heat treatment at 650 to 800° C. In this heat treatment step, further growth of the Bi phases 22 included in the alloy layer 12 is promoted. In particular, the large Bi phases included in the second region A2 are further grown by the heat treatment to increase the cross-sectional area. By setting the temperature in this heat treatment to 650° C. or more, the growth of the Bi phase 22 can be promoted, and by setting the temperature to 800° C. or less, the input energy can be reduced. Therefore, the heat treatment is preferably carried out at 650 to 800° C.

By the above procedure, the sliding member 10 where the cross-sectional area of the Bi phases 22 is controlled in the thickness direction of the alloy layer 12 can be produced. In the above embodiment, an example in which the alloy layer 12 is formed on the base material 11 in a cylindrical shape by centrifugal casting has been described. However, for example, a configuration in which an alloy to be the alloy layer 12 is cast on the base material 11 in an arc shape or a flat plate shape may be employed. Also in this case, the alloy layer 12 is formed on one interface 13 of the base material 11, and the other end face thereof can be cooled by the coolant 41 as in the above embodiment. When an intermediate layer is provided between the base material 11 and the alloy layer 12, the alloy layer 12 is cast on the base material 11 on which the intermediate layer has been formed in advance.

EXAMPLES

Figure 7:
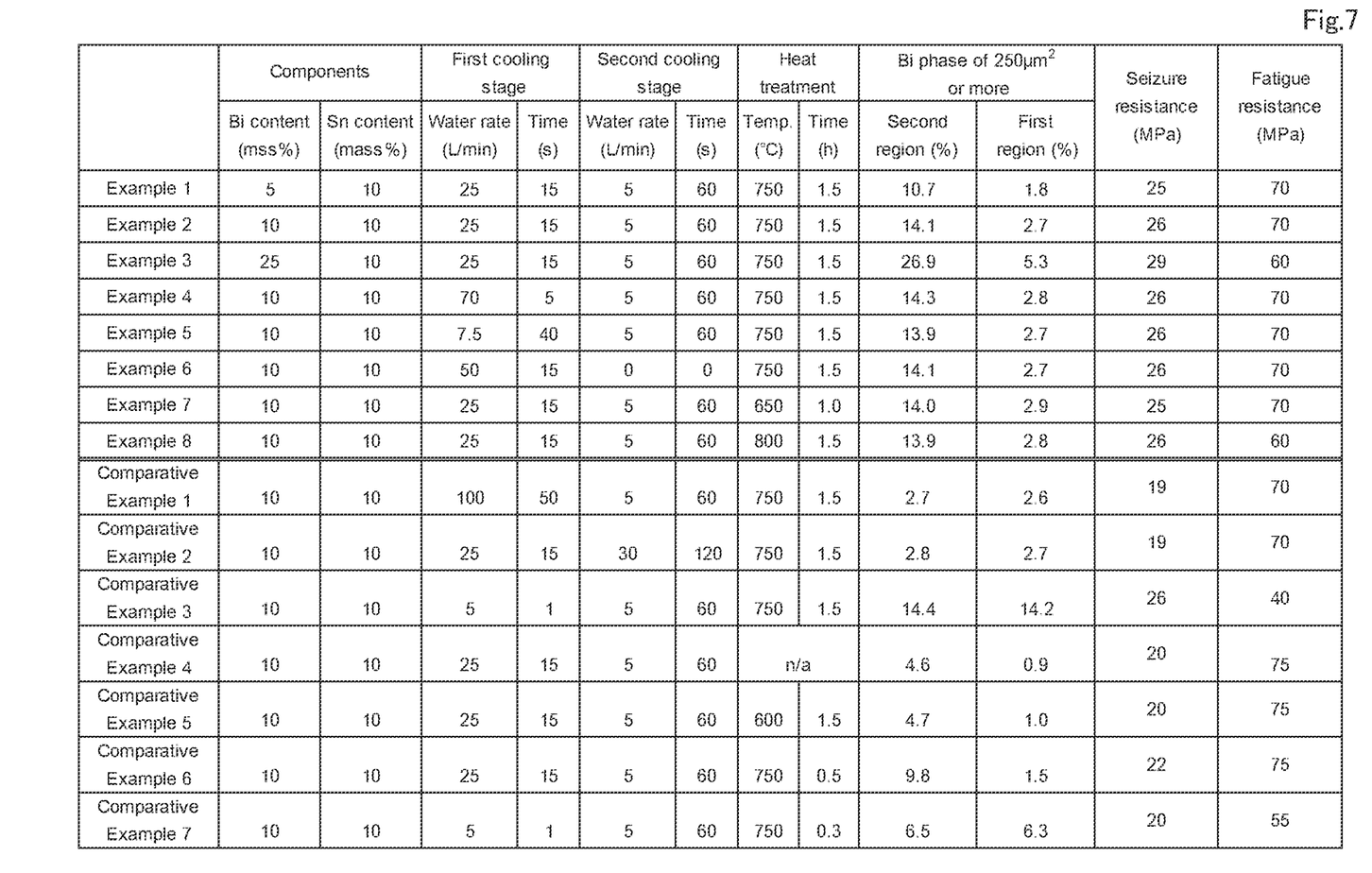
FIG. 7 shows a diagrammatic view showing verification results of Examples and Comparative Examples of a sliding member according to one embodiment.
Figure 8:
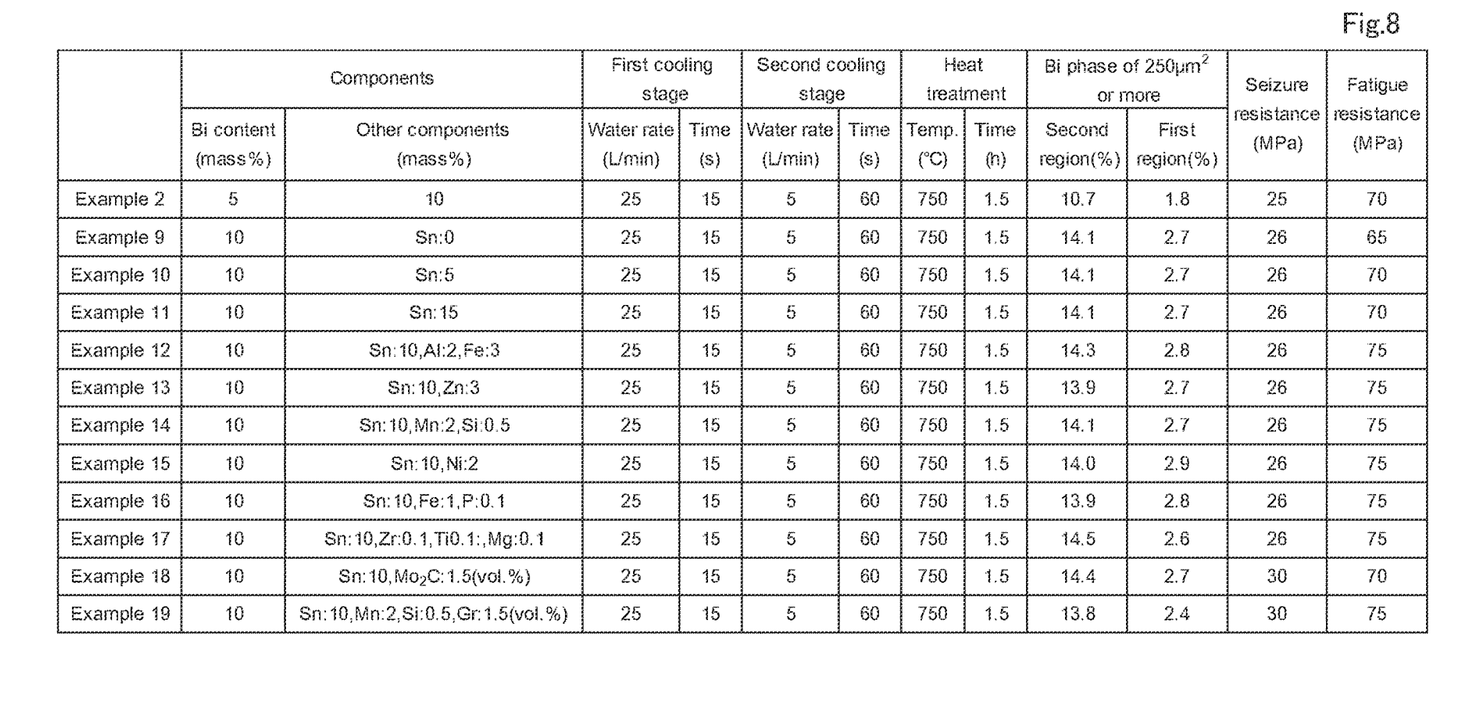
FIG. 8 shows a diagrammatic view showing verification results of Examples of a sliding member according to one embodiment.
Figure 9:
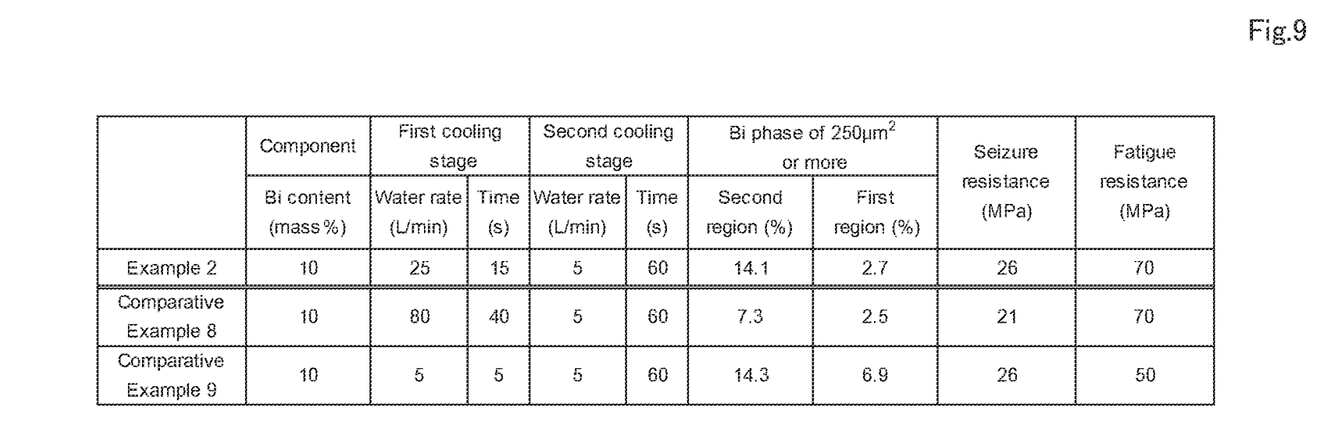
FIG. 9 shows a diagrammatic view showing verification results of Examples and Comparative Examples of a sliding member according to one embodiment.

Next, Examples of the present embodiment will be verified while being compared with Comparative Examples by using FIG. 7 to FIG. 9.

In the Examples and Comparative Examples, the base material 11 had a cylindrical shape having an inner diameter of 80 mm, an overall length in the axial direction of 120 mm, and a thickness of 5 mm. The alloy layer 12 was formed on the inner periphery of the base material 11 by centrifugally casting a Cu-based alloy. The thickness of the alloy layer 12 was 5 mm. Water was used as the coolant 41 in the cooling step. The actual flow rates and supply times of water serving as the coolant 41 are shown in FIG. 7 to FIG. 9. These flow rates of water are converted into the rates supplied per $cm^3$ of the base material 11 as follows. 5 liters/min is converted into 0.034 liters/min, 7.5 liters/min is converted into 0.050 liters/min, 25 liters/min is converted into 0.168 liters/min, 30 liters/min is converted into 0.202 liters/min, 50 liters/min is converted into 0.336 liters/min, 70 liters/min is converted into 0.470 liters/min, and 100 liters/min is converted into 0.672 liters/min.

The cross-sectional area and proportion by number of the "specific Bi phases" included in the alloy layer 12 were measured by image analysis. Specifically, a cross-sectional image of an observation cross section of the alloy layer 12 was acquired by using a microscope, and the acquired cross-sectional image was binarized into the matrix 21 and the Bi phases 22 of the alloy layer 12. Using image analysis software, the cross-sectional area of the Bi phases 22 included in the cross-sectional image was measured. The proportion by number of the "specific Bi phases" included in each of the first region A1 and the second region A2 was calculated from the measured cross-sectional area of the Bi phases 22. The cross-sectional area and proportion by number of the "specific Bi phases" in the Examples were obtained by observation at three locations in total in the vicinity of both ends and in the vicinity of the center in the axial direction of the sliding member 10 obtained, and the average values thereof were used.

The sliding member 10 was evaluated for seizure resistance and fatigue resistance. The seizure resistance was evaluated by rotating a shaft serving as the mating material 31 while applying a load to a sample prepared from the sliding member 10, and measuring the surface pressure when seizure occurred in the sample. As the sample, a test bushing having a length in the axial direction of 20 mm cut out from the sliding member 10 formed under the above conditions was used. The fatigue resistance was evaluated by rotating a shaft serving as the mating material 31 while applying a load to the sample, and measuring the maximum surface pressure at which no fatigue occurred as the fatigue resistance strength. As the sample, a test bushing having a length in the axial direction of 30 mm cut out from the sliding member 10 formed under the above conditions was used.

In Examples 2 and 4 to 8 and Comparative Examples 1 to 7 shown in FIG. 7, the content of Bi and the content of Sn included in the alloy layer 12 are the same. In these Examples 2 and 4 to 8 and Comparative Examples 1 to 7, the conditions of the first cooling stage and the second cooling stage in the cooling step and the conditions of the heat treatment step were changed. In addition, in Examples 1 and 3, the content of Bi included in the alloy layer 12 was changed. These Examples 1 to 8 satisfy the conditions of the cooling step and the heat treatment step of the present embodiment, and Comparative Examples 1 to 7 do not satisfy the conditions of the cooling step and the heat treatment step of the present embodiment.

Comparative Examples 1 and 2 indicate that when the rate of cooling water is excessive, the proportion by number of the "specific Bi phases" in the second region becomes equal to that in the first region A1. That is, when the rate of cooling water is excessive, the Bi phases 22 are refined in the entire alloy layer 12. Because of this, it can be seen that the amount of Bi supplied to the sliding surface 14 is reduced to lower the seizure resistance. In addition, Comparative Example 3 indicates that when the rate of cooling water is insufficient, the proportion by number of the "specific Bi phases" in the first region A1 becomes equal to that in the second region A2. That is, when the rate of cooling water is insufficient, the Bi phases are enlarged in the entire alloy layer 12. Because of this, it can be seen that the propagation of the crack 33 in the alloy layer 12 cannot be suppressed and that the fatigue resistance is lowered. Comparative Example 4 in which no heat treatment was carried out, Comparative Example 5 in which the heat treatment temperature was inadequate, and Comparative Example 6 in which the heat treatment time was inadequate all indicate that the generation of "specific Bi phases" is inhibited to lower the seizure resistance. Comparative Example 7 satisfies neither of the conditions of the cooling step and the conditions of the heat treatment step of the present embodiment. For this Comparative Example 7, the "specific Bi phases" in both the first region A1 and the second region A2 do not satisfy the present embodiment, indicating that both the seizure resistance and the fatigue resistance are lowered.

Example 2 and Examples 9 to 19 shown in FIG. 8 indicate the influence of various additive elements in the alloy layer 12. Example 9 does not include Sn in the alloy layer. From this, it can be seen that Example 2, which includes Sn in the alloy layer 12, has excellent fatigue resistance. Examples 12 to 17 include 5% by mass or less of one or two or more of Al, Zn, Mn, Si, Ni, Fe, P, Zr, Ti, and Mg in the alloy layer 12. These additive elements contribute to improvement of the fatigue resistance by solid solution strengthening in the matrix 21 of the alloy layer 12, compound precipitation, or the like. Example 18 includes $Mo_2C$ as a solid lubricant in the alloy layer 12, and Example 19 includes graphite as a solid lubricant in the alloy layer 12. In Examples 18 and 19, which each included a solid lubricant in the alloy layer 12, improvement in seizure resistance was observed.

FIG. 9 shows the influence of the cooling step, using Example 2 as a reference. In Comparative Example 8, the cooling in the first cooling stage of the cooling step was slightly more excessive than in Example 2. Because of this, in Comparative Example 8, the "specific Bi phases" were limitedly present in the range of about 5% from the sliding surface 14 in the thickness direction of the alloy layer 12. Because of this, the "specific Bi phases" included in the second region A2 decreased, and the supply of Bi to the sliding surface 14 was insufficient. As a result, Comparative Example 8 had a lower seizure resistance than Example 2. In addition, in Comparative Example 9, the cooling in the first cooling stage of the cooling step was slightly more inadequate than in Example 2. Because of this, in Comparative Example 9, the fine Bi phases were limitedly present in the range of about 14% from the interface 13 on the base material 11 in the thickness direction of the alloy layer 12. Because of this, the fine Bi phases included in the first region A1 were inadequate, and the propagation of the crack 33 in the alloy layer 12 was insufficiently reduced. As a result, Comparative Example 9 had a lower fatigue resistance than Example 2.

The present invention described above is not limited to the above embodiment, and can be applied to various embodiments as long as these do not depart from the scope of the gist of the present invention.

What is claimed is:

1. A sliding member comprising:
a base material; and
an alloy layer comprising Cu as a main component and Bi and having a sliding surface formed on a side opposite to the base material, wherein the alloy layer comprises:
a first region set to a region taking up 30% of a thickness of the alloy layer which is from an interface in contact with the base material toward the sliding surface;
a second region set to a region taking up 10% of the thickness of the alloy layer which is from the sliding surface toward the base material, and
in an arbitrary observation cross section of the alloy layer, a larger number of Bi phases having larger cross-sectional areas are distributed in the second region as compared to the first region,
wherein the Bi phases dispersed in the first region having a cross-sectional area of 250 $\mu m^2$ or more have a proportion by number of 6% or less in the arbitrary observation cross section, and
wherein the Bi phases dispersed in the second region having a cross-sectional area of 250 $\mu m^2$ or more have a proportion by number of 10% or more in the arbitrary observation cross-section.

2. A method for producing a sliding member, comprising:
casting an alloy layer comprising Cu as a main component and Bi on one surface of a base material; and
after casting, cooling the base material at a surface of the base material opposite the alloy layer with a coolant to solidify the alloy layer in one direction,
wherein, during cooling, when a preset set time has elapsed from a start thereof, a supply rate of the coolant is reduced to thereby control a size and number of Bi phases included in the alloy layer in a thickness direction of the alloy layer,
wherein the alloy layer comprises a first region set to a region taking up 30% of a thickness of the alloy layer which is from an interface in contact with the base material toward the sliding surface, a second region set to a region taking up 10% of the thickness of the alloy layer which is from the sliding surface toward the base material, and, in an arbitrary observation cross section of the alloy layer, a larger number of Bi phases having larger cross-sectional areas are distributed in the second region as compared to the first region,
wherein the Bi phases dispersed in the first region having a cross-sectional area of 250 $\mu m^2$ or more have a proportion by number of 6% or less in the arbitrary observation cross section, and
wherein the Bi phases dispersed in the second region having a cross-sectional area of 250 $\mu m^2$ or more have a proportion by number of 10% or more in the arbitrary observation cross-section.

3. The method for producing a sliding member according to claim 2, wherein the method further comprises, after cooling, holding a sliding member having the alloy layer formed on the base material at 650 to 800° C. for 1 hour or more.

4. The method for producing a sliding member according to claim 2, wherein the casting comprises centrifugal casting involving forming the alloy layer on an inner peripheral surface of the base material in a cylindrical shape while rotating the base material around an axis.

* * * * *